H. A. BROWN.
ANIMAL TRUSS.
APPLICATION FILED OCT. 22, 1913.
1,106,277.
Patented Aug. 4, 1914.
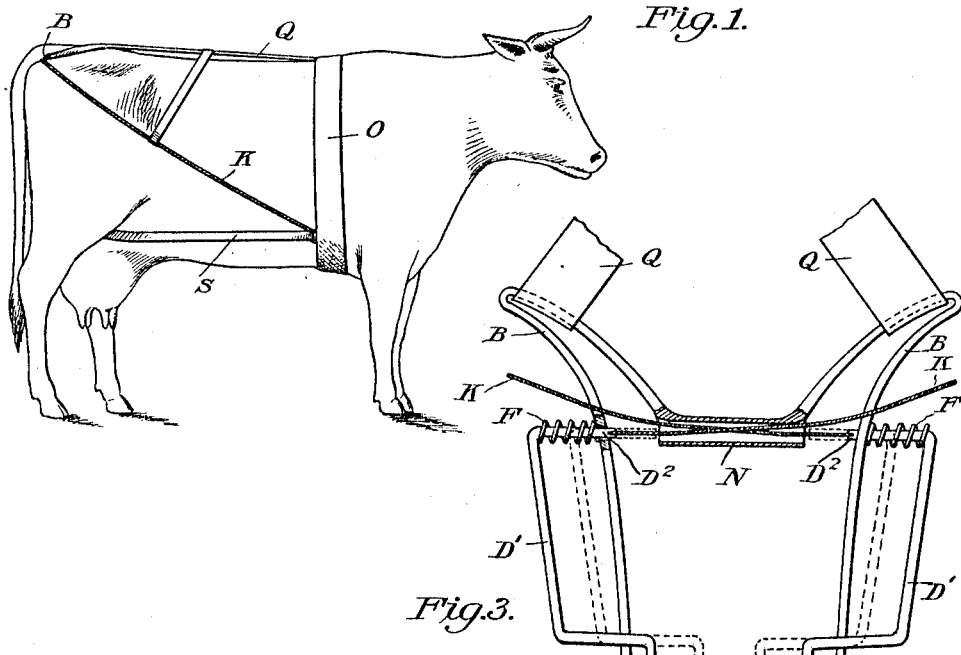
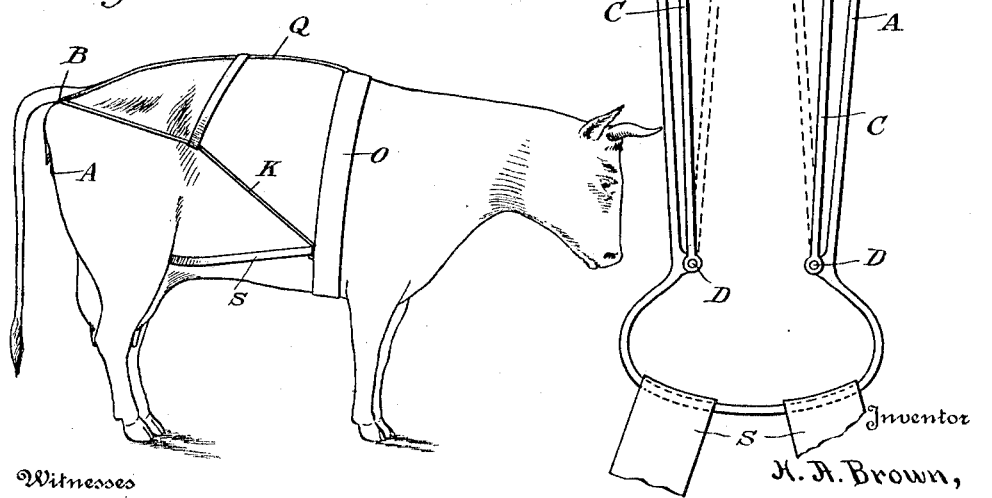

UNITED STATES PATENT OFFICE.

HENRY ARTHUR BROWN, OF ANTWERP, NEW YORK.

ANIMAL-TRUSS.

1,106,277. Specification of Letters Patent. Patented Aug. 4, 1914.

Application filed October 22, 1913. Serial No. 796,703.

*To all whom it may concern:*

Be it known that I, HENRY A. BROWN, a citizen of the United States, residing at Antwerp, in the county of Jefferson and State of New York, have invented certain new and useful Improvements in Animal-Trusses; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in animal trusses, and the object of the invention is to produce a truss to apply to a cow after it has given birth to a calf, and affording means for allowing the after birth to pass as well as to allow the animal to perform an evacuation of its bowels without any interference of the device.

My invention relates to various other details of construction and arrangements of parts as will be hereinafter fully described and then specifically defined in the appended claims.

My invention is illustrated in the accompanying drawings, which, with the letters of reference marked thereon, form a part of this application, and in which, Figure 1 is a side elevation of a cow, showing the application of the device thereto, Fig. 2 is a similar view showing the truss under strain, and Fig. 3 is an enlarged detail view of the truss.

Reference now being had to the details of the drawings by letter A designates a frame, preferably of metal, and of the general shape shown in Fig. 3 of the drawings, and has outwardly curved arms B, B, at one end, the portion between said arms being concaved and designed to fit up under the tail of the animal, as shown.

Two rods, each designated by letter C, are pivoted to the pins D, and which rods have outwardly bent portions D', with the ends D² of the rods disposed in alinement with each other. A coiled spring F is mounted upon each end of said rod and bears between the side of the frame and the bent portion D', the purpose of said springs being to normally hold the rods at their farthest outer limits, in which positions the parts are adapted to perform the function for which the device is intended. Cords K, are fastened, one to each rod near its free end, and each cord passes through a loop N and is fastened to the girt O, secured about the body of the animal. A webbing Q is fastened at one end to the girt at the back of the animal, and has fork-ends which are fastened, one to each arm B. Webbings, each designated by letter S, are fastened at corresponding ends to the lower end of the frame, and their outer ends are attached to the girt, each of said webbings passing, as shown, under the leg of the animal, and serving in coöperation with the webbing Q, to hold the frame in proper position.

When the truss is applied to the animal in the manner illustrated, it will allow the animal to perform an evacuation of its bowels without interference, but in the event of the animal straining itself, the cords which are fastened to the rods, and the draft upon the webbing, will cause the shank portions of the rods to be drawn to the positions shown in dotted lines in Fig. 3, and tend to protect the animal, preventing the inversion of the womb, and in no way interfere with the comfort of the animal.

What I claim to be new is,—

1. An animal truss comprising a frame and means for attaching same to an animal, movable members upon said frame, and means for actuating the members, as the animal to which the device is attached is under strain incident to an evacuation, whereby the members may be so positioned, as to prevent an inversion of the womb of the animal, as set forth.

2. An animal truss, comprising a frame and means for attaching same to an animal, spring pressed members upon the frame, and means for actuating the members, as the animal, to which the device is attached is under strain incident to an evacuation, whereby the members may be so positioned as to prevent an inversion of the womb of the animal, as set forth.

3. An animal truss, comprising a frame having curved extensions at one end thereof, designated to engage on either side of the tail of an animal, means for attaching the frame to the animal, pivotal spring actuated members upon the frame, and cords attached to said members and to the frame securing means, and so arranged that, when the animal is under strain, incident to making an evacuation, said members will be drawn toward each other, and tend to prevent an inversion of the womb of the animal, as set forth.

4. An animal truss comprising a frame with projections at one end thereof designed to engage on either side of the tail of the animal, bent rods pivoted to said frame, means for attaching the frame to the animal, springs interposed between the bent portions of the rods and the frame, and cords attached to said members, and to the frame securing means, as set forth.

In testimony whereof I hereunto affix my signature in presence of two witnesses.

HENRY ARTHUR BROWN.

Witnesses:
 JOSEPH D. WILLIAMS,
 ROY C. WISER.